United States Patent [19]

Einsiedler

[11] Patent Number: 5,536,123
[45] Date of Patent: Jul. 16, 1996

[54] ADJUSTABLE FIREPROOF PLUG WITH PLUG SCREW

[76] Inventor: Helmut Einsiedler, Hännerstr.4, D-79736 Rickenbach, Germany

[21] Appl. No.: 342,708

[22] Filed: Nov. 21, 1994

[30] Foreign Application Priority Data

Mar. 30, 1994 [DE] Germany .................. 44 10 988.1

[51] Int. Cl.$^6$ .................. F16B 13/04; F16B 13/06
[52] U.S. Cl. .................. 411/43; 411/55; 411/60; 411/107
[58] Field of Search .................. 411/43, 55, 60, 411/61, 34, 389, 107

[56] References Cited

U.S. PATENT DOCUMENTS

| | | | |
|---|---|---|---|
| 4,919,577 | 4/1990 | Binns | 411/43 |
| 4,930,959 | 6/1990 | Jagelid | 411/389 X |
| 4,950,115 | 8/1990 | Sadri | 441/43 X |
| 5,123,792 | 6/1992 | Strobel | 411/55 |
| 5,174,703 | 12/1992 | White | 411/107 |

*Primary Examiner*—Neill R. Wilson
*Attorney, Agent, or Firm*—Blakely, Sokoloff, Taylor & Zafman

[57] ABSTRACT

A metal plug with a plug screw in a casing for attachment of articles to penetrable material. The plug screw of the plug serves a dual function; fixing the plug in the material and also permitting the variation of the distance of the articles relative to the penetrable material. The plug screw has a plug-screw head at a back end, a constricted diameter portion designated as an intended breaking point, and a front end coupled to a spreading cone, a spreading head, and a fixing head. The plug is anchored in the penetrable material by means of the spreading head in the following way. First, by turning the plug screw by means of the plug-screw head, the spreading head with spreading jaws is pulled onto the spreading cone and the spreading jaws of the spreading head engage in the penetrable material. By further turning the plug screw, the spreading cone is tensioned in the spreading head and the plug screw is broken at the intended breaking point, severing the screw into a front plug-screw part and a back plug-screw part connected by way of the casing. The front plug-screw part fixes the plug in the penetrable material by means of the spreading jaws of the spreading head. The back plug-screw part provides a variation margin for leveling the attached article to the penetrable material.

2 Claims, 2 Drawing Sheets

ADJUSTABLE FIREPROOF PLUG WITH PLUG SCREW

FIELD OF THE INVENTION

The invention relates generally to an attachment system for articles to be fixed upon penetration and more particularly relates to a fireproof plug with an associated plug screw having the dual function of fixing the plug in the penetration material and the possibility of varying the distance of articles relative to the penetration material by means of the plug screw.

BACKGROUND OF THE INVENTION

A typical application in this regard are suspended claddings of ceilings in various types of rooms or of wall panels when the latter are attached to side walls. Suspended ceilings are known per se, in particular in industrial buildings, where piping of very varied types arid purposes are clad. In this sector there is a variety of extreme by means of which the suspension can be brought about.

It is a different situation in the field of carpentry and plastering. These cases usually concern only the decorative lining of rooms in the design of suspended ceilings or in fitted-on panels.

If appropriate, both types of lining can additionally be combined with a backing insulation. In these cases, fastening systems are required which guarantee a permanent, fireproof and sturdy anchorage in the penetration material.

Furthermore, consideration must also be given to the lack of space available to be able to carry out a large-area leveling of the cladding in relation to the penetration material.

A particular problem in the application sector cited is the alignment of the systems to be fixed in the penetration material. For example, said occupation groups, for example carpenters, always have to fall back on the old method of packing for the horizontal alignment of suspended ceiling claddings if concrete ceilings, for example, are uneven. Easy-to-handle fireproof plugs according to DIN 4102, complying with fire protection category 90/120, indeed belong to the prior art. However, once fixed, these can no longer be changed, which makes it impossible to vary the distance between the penetration material and the material to be fixed if the plug anchorage is not to be weakened.

It is thus a case of specific skilled work in which a planar and precisely leveled surface alignment is essential for the professional execution of the work.

This is understood to mean that for the ceilings, usually consisting of concrete, and wall materials, consisting of masonry bricks, to be clad, anchorage and fastening distance leveling systems for the cladding material are required which, on the one hand, guarantee a permanent, fireproof and statically stable attachment of the cladding material D in the material (penetration material C) to be clad and, on the other hand, allow the cladding article D, which is to be fixed, still to be varied, alter anchorage, in terms of its level in relation to the penetration material C within a given distance range X.

The object of the invention was thus to find an attachment system for articles to be fixed on penetration materials, for example for suspended ceiling cladding panels for concrete ceilings, which system complies with the fire protection guidelines, guarantees a permanent and firmly fixed anchorage of the claddings to be fixed in the penetration material, and allows the cladding to be aligned horizontally or vertically, if possible within one operation. In this case, one operation is understood to mean that, wherever possible, no further time-consuming or material-consuming manipulations have to be carried out.

SUMMARY OF THE INVENTION

The object was achieved by a combined metal plug A, consisting of a plug casing 3 with the spreading cone G and a plug screw B which is located in the plug casing and is integrated in the plug by means of the thread guiding casing 8 and the internal thread 24 of the spreading cone G, wherein the plug screw B has a diameter constriction 9, designated as intended breaking point, and a spreading cone G is situated at the end of the plug casing 3, having an internal thread 24 which receives the plug screw B, and a spreading head E with the spreading jaws 23 is situated at the front end of the plug screw B, held at a positioning distance by a spacer F and firmly connected to the plug screw B, and the plug A is anchored in the penetration material C by means of the spreading head E by the following functioning;

by turning the plug screw B by means of the plug-screw head 1, the spreading head E together with the spreading jaws 23 in pulled onto the spreading cane G, as a result of which the spreading jaws 23 engage in the material C to be anchored, and by further turning of the plug screw B, the spreading cone G is tensioned in the spreading head E, as a result of which the spreading jaws 23 are tensioned in the penetration material C to an increasingly greater extent and the tensile force which is converted by the torque of the plug screw into torsional shearing force, acting on the plug screw, up to a value which corresponds to the intended breaking value of the plug screw in the intended breaking point, the constriction point 9, and at which the breakage of the plug screw into two parts occurs, the front plug-screw part 12 and the back plug-screw part 7, and the two plug-screw parts fulfill their own functions as now follows;

a.) the front plug-screw part 12 fixes the plug A in the penetration material C by means of the spread spreading jaws 23 of the spreading head E and via the internal thread 24 of the spreading cone G, connected to the plug casing 3 with the thread guiding casing 8, as a result of which there is a connection via the casing 3 to the back plug-screw part 7, and b.) due to the further turning of the plug-screw head 1 by means of the thread guiding casing 8, the back plug-screw part 7 now has a linear distance movement range X as a variation margin for leveling the attachment article D.

Situated in the inner region of the spreading jaws 23, between the spreading cone G and the end of the inner region of the spreading head is a so-called spacer F which may be made of aluminum, brass or polyamide. Said spacer holds the spreading head E in the end position of the front part of the plug screw. On the other hand, the spacer is shaped in such a way that it fits into the neck of the spreading cone.

When the plug A is driven into the penetration material C, the spreading-head E is thus held at the end distance of the front part 12 of the screw B and prevents the spreading jaws 23 from undesirably engaging prematurely. Furthermore, the spacer F prevents the spreading head E tilting when the plug is being driven in.

When the spreading head is tensioned, the spacer slides, if appropriate, into the specially shaped neck of the spreading cone G.

The object of the invention was therefore achieved furthermore by a metal plug A, as dealt with above, wherein furthermore a spacer F is situated on the plug screw B in the inner region of the spreading jaws 23 between the spreading cone G and the end of the inner region of the spreading head, which spacer prevents the spreading head E being pushed prematurely onto the spreading cone G and the spreading head possibly becoming tilted in the penetration material C when the plug A is driven into the penetration material C.

BRIEF DESCRIPTION OF THE DRAWINGS

The design of the subject-matter of the invention is illustrated in detail with reference to the following FIGS. 1 to 5 and thus explained specifically.

DETAILED DESCRIPTION OF THE INVENTION

Figure 1:
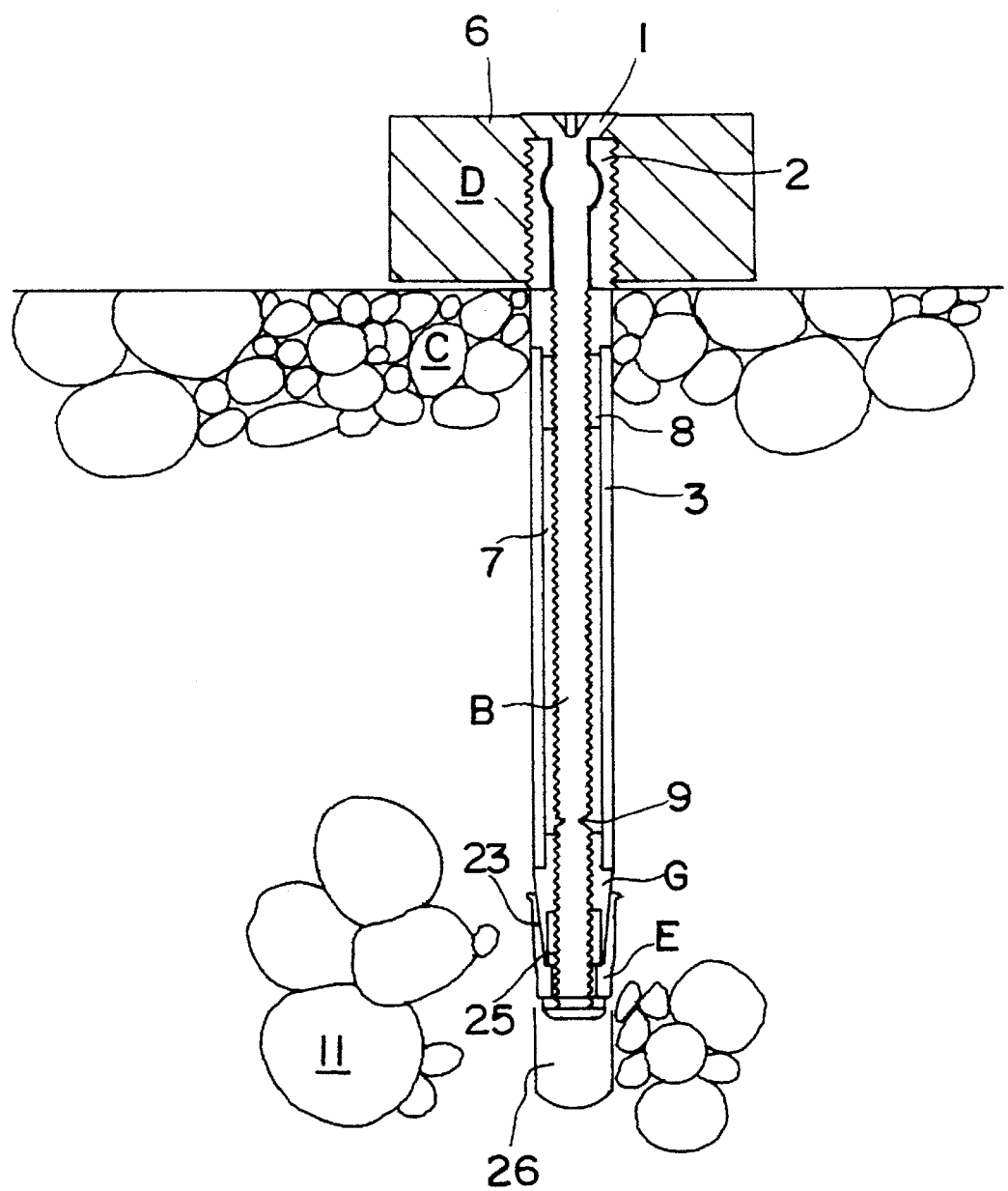
FIG. 1 is a cross-sectional planar side view through the plug.
Figure 2:
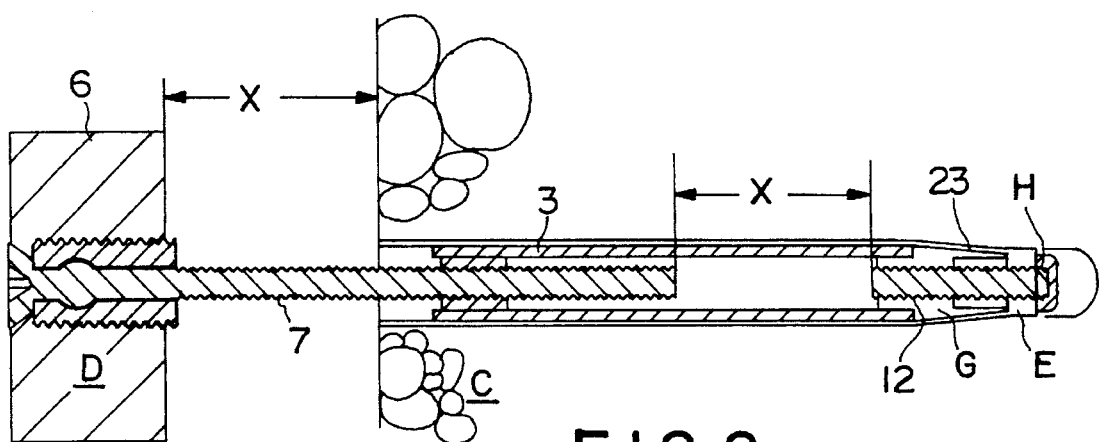
FIG. 2 is a cross-sectional planar side view of the plug wherein the plug is fixed in the penetration material.
Figure 3:
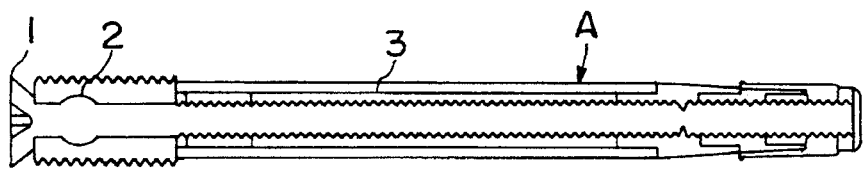
FIG. 3 is a cross-sectional planar side view of the plug screw in the plug screw casing.
Figure 4:
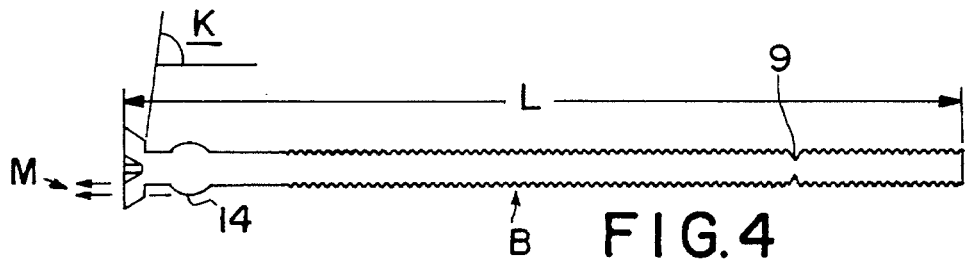
FIG. 4 is a cross-sectional planar side view of the plug screw.
Figure 5:
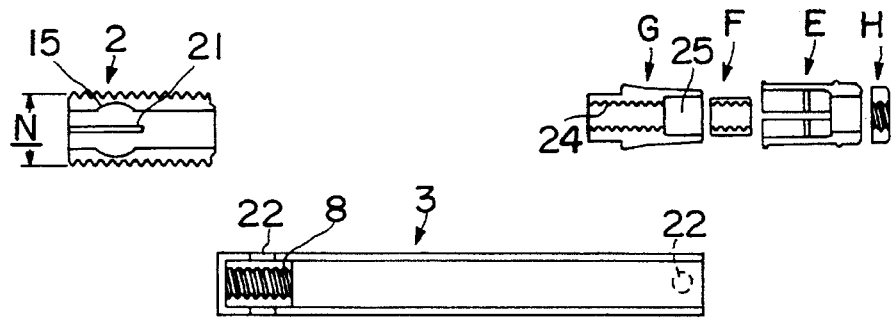
FIG. 5 is a cross-sectional exploded planar view of the constituent parts forming the fireproof plug.

FIG. 1 shows a section through the mid-axis of the plug A according to the invention in the state just after it has been driven into the penetration material C, FIG. 2 shows the same section in the state after the fixing of the plug in the penetration material by means of the spreading jaws 23 of the spreading head E, the breaking of the plug screw B, which has already occurred in the intended breaking point 9, and the leveling of the cladding article D to the distance X, relative to the penetration material C and the cladding article D, FIG. 3 shows the plug A in the plan view open through the mid-axis, FIG. 4 shows the plug screw B in the plan view, FIG. 5 shows the constituent parts forming the plug A apart from the-plug screw; specifically the grooved casing 2 with the expansion gaps 21 for fitting the casing over the plug-screw bead 16. The casing 2 causes the casing 2 to be fixed in the article D and a rotary bearing for the plug-screw bead 16 to be formed after the plug has been driven in through the article to be attached. As a result, the article D to be attached can be leveled back and forth as desired without expanding (loosening) the driving-in hole in the article to be attached. FIG. 5 furthermore shows the plug casing 3 with the assembly fixing holes 22 and the thread guiding casing 8, the spreading cone G with the internal thread 24 and the spacer cavity 25, the spreading head E with the spreading jaws 23, and the fixing head H which is firmly wedged, welded or otherwise firmly anchored with the end of the plug screw.

The plug according to the invention constitutes a significant technical improvement, The operating system which can be implemented with this plug is also significant to the environment. With this system, it is possible, for example, to exchange one type of cladding for another without the plug anchorage having to be exchanged. For exchange of a cladding, for the purpose of facilitating the work, only the plug half-screw 7 and the casing 2 would be sufficient to fix a new type of cladding in the existing plug anchorage.

The FIGS listed are to be considered as examples.

List of Reference Numbers

1 Plug-screw head
2 Grooved casing
3 Plug casing
4 Plug spreading jaws
6 Wooden batten
7 Back piece of the plug screw to vary the distance of the attachment article in relation to the penetration material
8 Thread guiding casing for 7
9 Intended breaking point, plug-screw diameter constriction
11 Penetration material—concrete
12 Front piece of the plug screw
13 Welding of the plug screw
14 Neck bead of the plug screw
15 Engagement depression of the casing neck
16 Plug-screw bead
21 Expansion gap of the grooved casing 3
22 Assembly fixing hole
23 Spreading Jaws of E
24 Internal thread of the spreading cone G
25 Spacer cavity
26 Drill hole cavity
A Plug
B Plug screw
C Penetration material
D Article to be fixed
E Spreading head
F Spacer
G Spreading cone
H Fixing head
K Width angle
L Total length of the plug screw
M Balancing distance of the plug-screw bead
X variable distance between C and D =practical distance between C and D
N Diameter of the grooved casing 2

I claim:

1. A metal plug (A) comprising: a plug casing (3) and a plug screw (B) which is located in the plug casing and is integrated in the plug by means of thread guiding casing (8) portion of the plug casing, wherein the plug screw (B) has a plug-screw head at the rear end, a constricted diameter portion (9) designated as an intended breaking point, a spreading cone (G) with a neck portion situated at the end of the plug casing (3) and an internal thread portion (24) which receives the plug screw (B), a spreading head (E) with spreading jaws (23) situated at the front end of the plug screw (B) and firmly connected to the plug screw (B), and a fixing head (H) situated at the front end of the plug screw (B) adjacent to the spreading head (El and coupled to the plug screw, and wherein the plug (A) is anchored in the penetration material (C) by means of the spreading head (E) by turning the plug screw (B) by means of the plug-screw head (1), the spreading head (E) together with the spreading jaws (23) is pulled onto the spreading cone (G), as a result of which the spreading jaws (23) engage in the material (C) to be anchored, and by further turning of the plug screw (B), the spreading cone (G) is tensioned in the spreading head (E), as a result of which the spreading jaws (23) are tensioned in the penetration material (C) to an increasingly greater extent and the tensile force which is converted by the torque of the plug screw into torsional shearing force, acting on the plug screw, up to a value which corresponds to the intended breaking value of the plug screw at the constricted diameter portion (9), and at which the breakage of the plug screw into two parts occurs, the front plug-screw part (12) and the back plug-screw part (7), and the two plug-screw pans fulfill their own functions as follows;

a.) the front plug-screw part (12) fixes the plug (A) in the penetration material (C) by means of the spreading jaws (23) of the spreading head (E) and via the internal thread (24) of the spreading cone (G), connected to the plug casing (3) with the thread guiding casing (8), as a result of which there is a connection via the casing (3) to the back plug-screw part (7), and b.) due to the further turning of the plug-screw head (1) by means of the thread guiding casing (8), the back plug-screw part (7) now has a linear distance movement range (X) as a variation margin for leveling the attachment article (D).

2. The metal plug of claim 1, wherein a spacer (F) is situated on the plug screw (B) in the inner region of the spreading jaws (23) between the spreading cone (G) and the end of the inner region of the spreading head, which spacer holds the spreading head (E) in the end position of the plug screw (B) and prevents the spreading head from prematurely engaging with the spreading cone (G) and also prevents the spreading head possibly becoming tilted in the penetration material (C) when the plug (A) is driven into the penetration material (C) and which spacer (F) slides into the neck portion of the spreading cone (G) when the spreading cone (G) is tensioned in the spreading head.

* * * * *

UNITED STATES PATENT AND TRADEMARK OFFICE
CERTIFICATE OF CORRECTION

PATENT NO. : 5,536,123
DATED : July 16, 1996
INVENTOR(S) : Einsiedler

It is certified that error appears in the above-indentified patent and that said Letters Patent is hereby corrected as shown below:

In column 1 at line 63, please delete " for " and insert -- on --.

In column 4 at line 34, please delete " v " and insert -- V --.

In column 4 at line 39, please delete " of " and insert -- of a --.

In column 4 at line 49, please delete " (E] " and insert -- (E) --.

Signed and Sealed this

Fifth Day of August, 1997

Attest:

BRUCE LEHMAN

Attesting Officer

Commissioner of Patents and Trademarks